(12) United States Patent
Saito

(10) Patent No.: US 8,211,512 B2
(45) Date of Patent: *Jul. 3, 2012

(54) LIQUID CRYSTAL COMPOSITION AND LIQUID CRYSTAL DISPLAY DEVICE

(75) Inventor: Masayuki Saito, Ichihara (JP)

(73) Assignees: JNC Corporation, Tokyo (JP); Chisso Petrochemical Corporation, Tokyo (JP)

( * ) Notice: Subject to any disclaimer, the term of this patent is extended or adjusted under 35 U.S.C. 154(b) by 112 days.

This patent is subject to a terminal disclaimer.

(21) Appl. No.: 12/819,010

(22) Filed: Jun. 18, 2010

(65) Prior Publication Data

US 2011/0001918 A1   Jan. 6, 2011

(30) Foreign Application Priority Data

Jul. 2, 2009   (JP) ................................ 2009-157851

(51) Int. Cl.
*C09K 19/30* (2006.01)
*C09K 19/12* (2006.01)
*C09K 19/32* (2006.01)
*C09K 19/34* (2006.01)
*C09K 19/20* (2006.01)
*C09K 19/52* (2006.01)

(52) U.S. Cl. ............ 428/1.1; 252/299.01; 252/299.61; 252/299.62; 252/299.63; 252/299.66; 252/299.67

(58) Field of Classification Search ............ 428/1.1; 252/299.61, 299.63, 299.66, 299.67, 299.62, 252/299.01
See application file for complete search history.

(56) References Cited

U.S. PATENT DOCUMENTS

| | | | |
|---|---|---|---|
| 4,565,425 A | 1/1986 | Petrzilka et al. | 350/350 R |
| 5,500,752 A * | 3/1996 | Schadt et al. | 349/124 |
| 5,965,060 A | 10/1999 | Tarumi et al. | 252/299.63 |
| 6,066,268 A | 5/2000 | Ichinose et al. | 252/299.63 |
| 6,376,030 B1 * | 4/2002 | Heckmeier et al. | 428/1.1 |
| 6,572,938 B2 * | 6/2003 | Yanai et al. | 428/1.1 |
| 6,638,581 B2 * | 10/2003 | Heckmeier et al. | 428/1.1 |
| 6,764,722 B2 | 7/2004 | Klasen et al. | 428/1.1 |
| 2002/0014613 A1 | 2/2002 | Klasen et al. | 252/299.63 |
| 2010/0309402 A1 * | 12/2010 | Kobayashi et al. | 349/54 |
| 2010/0328600 A1 * | 12/2010 | Shimada et al. | 349/182 |
| 2011/0272630 A1 * | 11/2011 | Shimada et al. | 252/299.61 |

FOREIGN PATENT DOCUMENTS

| | | |
|---|---|---|
| JP | 59-176221 | 10/1984 |
| JP | 61-027928 | 2/1986 |
| JP | 03-017185 | 1/1991 |
| JP | 10-176167 | 6/1998 |
| JP | 11-140447 | 5/1999 |
| JP | 2001-354967 | 12/2001 |
| WO | WO 2009031437 A1 * | 3/2009 |
| WO | WO 2009034867 A1 * | 3/2009 |
| WO | WO 2010084810 A1 * | 7/2010 |
| WO | WO 2010095493 A1 * | 8/2010 |

* cited by examiner

*Primary Examiner* — Shean Wu
(74) *Attorney, Agent, or Firm* — Hogan Lovells US LLP

(57) ABSTRACT

The subject is to provide a liquid crystal composition that satisfies at least one characteristic among characteristics such as a high maximum temperature of a nematic phase, a low minimum temperature of a nematic phase, a low viscosity, a suitable optical anisotropy, a negatively large dielectric anisotropy, a large specific resistance, a high stability to ultraviolet light and a high stability to heat, or that is suitably balanced regarding two or more characteristics. The subject is to provide an AM device that has a short response time, a high voltage holding ratio, a high contrast ratio, a long service life and so forth.

The invention provides a liquid crystal composition having a negative dielectric anisotropy that contains a specific compound having a negatively large dielectric anisotropy as a first component, and a specific two-ring compound having a low viscosity as a second component, and provides a liquid crystal display device containing the composition.

20 Claims, No Drawings

LIQUID CRYSTAL COMPOSITION AND LIQUID CRYSTAL DISPLAY DEVICE

BACKGROUND OF THE INVENTION

1. Field of the Invention

The invention relates mainly to a liquid crystal composition suitable for use in an active matrix (AM) device, and an AM device containing the composition. More specifically, the invention relates to a liquid crystal composition having a negative dielectric anisotropy, and a device having a mode such as IPS (in-plane switching), VA (vertical alignment) or PSA (polymer sustained alignment) containing the composition.

2. Related Art

In a liquid crystal display device, a classification based on an operating mode for liquid crystals includes phase change (PC), twisted nematic (TN), super twisted nematic (STN), electrically controlled birefringence (ECB), optically compensated bend (OCB), in-plane switching (IPS), vertical alignment (VA), and polymer sustained alignment (PSA). A classification based on a driving mode in the device includes a passive matrix (PM) and an active matrix (AM). The PM is further classified into static, multiplex and so forth, and the AM is classified into a thin film transistor (TFT), a metal-insulator-metal (MIM) and so forth. The TFT is further classified into amorphous silicon and polycrystal silicon. The latter is classified into a high temperature type and a low temperature type according to the production process. A classification based on a light source includes a reflection type utilizing natural light, a transmission type utilizing a backlight and a semi-transmission type utilizing both natural light and a backlight.

These devices contain a liquid crystal composition having suitable characteristics. The liquid crystal composition has a nematic phase. General characteristics of the composition should be improved to give an AM device having good general characteristics. Table 1 below summarizes the relationship between the general characteristics of the two. The general characteristics of the composition will be explained further based on a commercially available AM device. The temperature range of a nematic phase relates to the temperature range in which the device can be used. A desirable maximum temperature of the nematic phase is approximately 70° C. or higher and a desirable minimum temperature of the nematic phase is approximately −10° C. or lower. The viscosity of the composition relates to the response time of the device. A short response time is desirable for displaying a moving image on the device. Accordingly, a low viscosity of the composition is desirable. A low viscosity at a low temperature is more desirable.

TABLE 1

General Characteristics of a Liquid Crystal Composition and an AM Device

| No | General Characteristics of a Composition | General Characteristics of an AM Device |
|---|---|---|
| 1 | Temperature range of a nematic phase is wide | Usable temperature range is wide |
| 2 | Viscosity is low[1] | Response time is short |
| 3 | Optical anisotropy is suitable | Contrast ratio is high |
| 4 | Dielectric anisotropy is positively or negatively large | Threshold voltage is low and electric power consumption is low |
| | | Contrast ratio is high |
| 5 | Specific resistance is large | Voltage holding ratio is high and a contrast ratio is high |
| 6 | It is stable to ultraviolet light and heat | Service life is long |

[1]A liquid crystal composition can be injected into a liquid crystal cell in a shorter period of time.

The optical anisotropy of the composition relates to the contrast ratio of the device. The product (Δn·d) of the optical anisotropy (Δn) of the composition and the cell gap (d) of the device is designed to maximize the contrast ratio. A suitable value of the product depends on the kind of operating modes. In a device having a VA mode, a suitable value is in the range of approximately 0.30 μm to approximately 0.40 μm. In a device having an IPS mode, a suitable value is in the range of approximately 0.20 μm to approximately 0.30 μm. In this case, a composition having a large optical anisotropy is desirable for a device having a small cell gap. The dielectric anisotropy having a large absolute value in the composition contributes to a low threshold voltage, a low electric power consumption and a high contrast ratio of the device. Accordingly, the dielectric anisotropy having a large absolute value is desirable. A large specific resistance of the composition contributes to a high voltage holding ratio and a high contrast ratio of the device. Accordingly, a composition having a large specific resistance is desirable at room temperature and also at a high temperature in the initial stage. A composition having a large specific resistance is desirable at room temperature and also at a high temperature after it has been used for a long time. The stability of the composition to ultraviolet light and heat relates to the service life of the liquid crystal display device. In the case where the stability is high, the device has a long service life. These characteristics are desirable for an AM device used in a liquid crystal projector, a liquid crystal television and so forth.

A composition having a positive dielectric anisotropy is used for an AM device having a TN mode. On the other hand, a composition having a negative dielectric anisotropy is used for an AM device having a VA mode. A composition having a positive or negative dielectric anisotropy is used for an AM device having an IPS mode. A composition having a positive or negative dielectric anisotropy is used for an AM device having a PSA mode. Examples of liquid crystal composition having a negative dielectric anisotropy are disclosed in the following patent documents Nos. 1 to 6.

No. 1: JP S59-176221 A; No. 2: JP S61-27928 A; No. 3: JP H3-17185 A; No. 4: JP H10-176167 A; No. 5: JP H11-140447 A; No. 6: JP 2001-354967 A.

A desirable AM device is characterized as having a wide usable temperature range, a short response time, a high contrast ratio, a low threshold voltage, a high voltage holding ratio, a long service life and so forth. Even one millisecond shorter response time is desirable. Thus, a composition having characteristics such as a high maximum temperature of a nematic phase, a low minimum temperature of a nematic phase, a low viscosity, a suitable optical anisotropy, positively or negatively large dielectric anisotropy, a large specific resistance, a high stability to ultraviolet light, and a high stability to heat is especially desirable.

SUMMARY OF THE INVENTION

The invention concerns a liquid crystal composition having a negative dielectric anisotropy, which includes at least one compound selected from the group of compounds represented by formula (1) as a first component and at least one compound selected from the group of compounds represented by formula (2) as a second component, and a liquid crystal display device containing the composition.

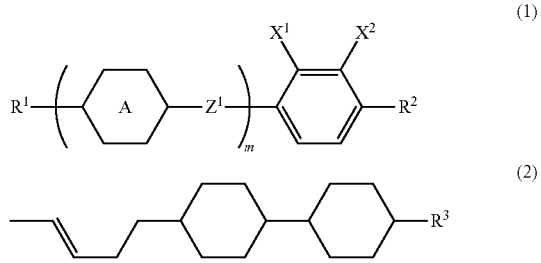

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $R^3$ is independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring g A is independently 1,4-cyclohexylene or 1,4-phenylene; $Z^1$ is independently a single bond, ethylene, methyleneoxy or carbonyloxy; $X^1$ and $X^2$ are each independently fluorine or chlorine; m is 1, 2 or 3.

The invention also concerns a liquid crystal display device that includes the liquid crystal composition and so forth.

DETAILED DESCRIPTION OF THE INVENTION

One of the advantages of the invention is to provide a liquid crystal composition that satisfies at least one characteristic among the characteristics such as a high maximum temperature of a nematic phase, a low minimum temperature of a nematic phase, a low viscosity, a suitable optical anisotropy, a negatively large dielectric anisotropy, a large specific resistance, a high stability to ultraviolet light and a high stability to heat. Another advantage of the invention is to provide a liquid crystal composition that is suitably balanced regarding at least two characteristics. A further advantage of the invention is to provide a liquid crystal display device that contains the liquid crystal composition. An additional advantage of the invention is to provide a liquid crystal composition that has a suitable optical anisotropy that is a small optical anisotropy or a large optical anisotropy, a negatively large dielectric anisotropy, a high stability to ultraviolet light and so forth, and is to provide an AM device that has a short response time, a high voltage holding ratio, a high contrast ratio, a long service life and so forth.

The terms used in the specification and claims are defined as follows. The liquid crystal composition and the liquid crystal display device of the invention may occasionally be abbreviated to "the composition" and "the device," respectively. A liquid crystal display device is a generic term for a liquid crystal display panel and a liquid crystal display module. The "liquid crystal compound" is a generic term for a compound having a liquid crystal phase such as a nematic phase and a smectic phase, and also for a compound having no liquid crystal phase but being useful as a component of a composition. The useful compound has a 6-membered ring such as 1,4-cyclohexylene and 1,4-phenylene, and a rod-like molecular structure. An optically active compound and a polymerizable compound may occasionally be added to the composition. Even in the case where these compounds are liquid crystal compounds, the compounds are classified as an additive herein. At least one compound selected from a group of compounds represented by formula (1) may occasionally be abbreviated to "the compound (1)." "The compound (1)" means one compound, or two or more compounds represented by formula (1). The same rules apply to compounds represented by the other formulas. "Arbitrary" is used not only in cases when the position is arbitrary but also in cases when the number is arbitrary, however, is not used in cases when the number is zero.

A higher limit of the temperature range of a nematic phase may occasionally be abbreviated to "a maximum temperature." A lower limit of the temperature range of a nematic phase may occasionally be abbreviated to "a minimum temperature." That "a specific resistance is large" means that a composition has a large specific resistance at room temperature and also at a temperature close to the maximum temperature of a nematic phase in the initial stage, and that the composition has a large specific resistance at room temperature and also at a temperature close to the maximum temperature of a nematic phase even after it has been used for a long time. That "a voltage holding ratio is high" means that a device has a high voltage holding ratio at room temperature and also at a temperature close to the maximum temperature of a nematic phase in the initial stage, and that the device has a high voltage holding ratio at room temperature and also at a temperature close to the maximum temperature of a nematic phase even after it has been used for a long time. When characteristics such as optical anisotropy are explained, values which are obtained according to the measuring methods described in Examples will be used. A first component means one compound, or two or more compounds. "A ratio of the first component" means the percentage by weight (% by weight) of the first component based on the total weight of the liquid crystal composition. The same rule applies to a ratio of the second component and so forth. A ratio of an additive mixed into the composition means the percentage by weight (% by weight) or weight parts per million (ppm) based on the total weight of the liquid crystal composition.

The symbol $R^1$ is used for a plurality of compounds in the chemical formulas of component compounds. $R^1$ may be identical or different in two arbitrary ones of the compounds. In one case, for example, $R^1$ of the compound (1) is ethyl and $R^1$ of the compound (4-1) is ethyl. In another case, $R^1$ of the compound (1) is ethyl and $R^1$ of the compound (4-1) is propyl. The same rule applies to the symbols $R^2$, $Z^1$, and so forth.

The invention includes the following items.

[1] A liquid crystal composition having a negative dielectric anisotropy that includes at least one compound selected from the group of compounds represented by formula (1) as a first component and at least one compound selected from the group of compounds represented by formula (2) as a second component:

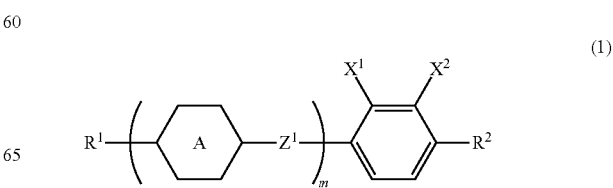

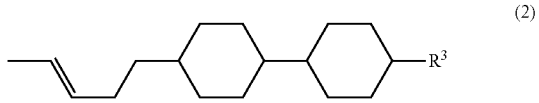
(2)

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $R^3$ is independently alkyl having 1 to 12 carbons, alkoxy having 1 to 12 carbons, or alkenyl having 2 to 12 carbons in which arbitrary hydrogen is replaced by fluorine; ring A is independently 1,4-cyclohexylene or 1,4-phenylene; $Z^1$ is independently a single bond, ethylene, methyleneoxy or carbonyloxy; $X^1$ and $X^2$ are each independently fluorine or chlorine; m is 1, 2 or 3.

[2] The liquid crystal composition according to item 1, wherein the first component is at least one compound selected from the group of compounds represented by formulas (I-1) and (1-7):

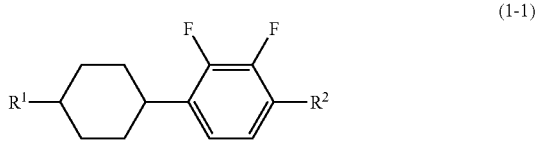
(1-1)

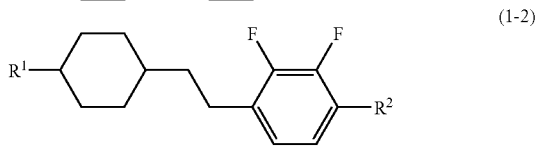
(1-2)

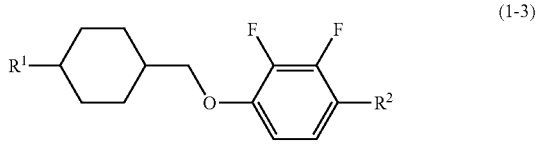
(1-3)

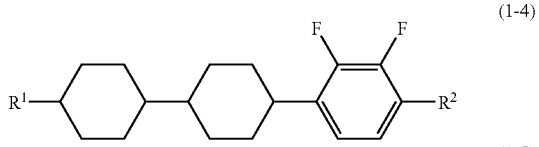
(1-4)

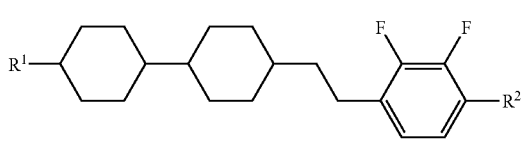
(1-5)

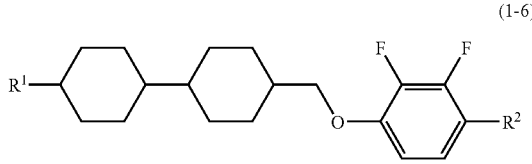
(1-6)

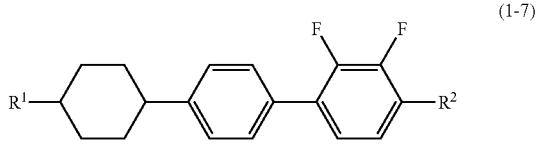
(1-7)

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

[3] The liquid crystal composition according to item 2, wherein the first component is at least one compound selected from the group of compounds represented by formulas (I-1):

[4] The liquid crystal composition according to item 2, wherein the first component is at least one compound selected from the group of compounds represented by formula (I-4).

[5] The liquid crystal composition according to item 2, wherein the first component is at least one compound selected from the group of compounds represented by formulas (I-7).

[6] The liquid crystal composition according to item 2, wherein the first component is a mixture of at least one compound selected from the group of compounds represented by formula (I-1) and at least one compound selected from the group of compounds represented by formula (1-4).

[7] The liquid crystal composition according to item 2, wherein the first component is a mixture of at least one compound selected from the group of compounds represented by formula (1-1) and at least one compound selected from the group of compounds represented by formula (1-7).

[8] The liquid crystal composition according to any one of items 1 to 7, wherein the ratio of the first component is in the range of approximately 5% to approximately 60% by weight and the ratio of the second component is in the range of approximately 5% to approximately 40% by weight, based on the total weight of the liquid crystal composition.

[9] The liquid crystal composition according to any one of items 1 to 8 that further includes at least one compound selected from the group of compounds represented by formula (3-1) and formula (3-2) as a third component:

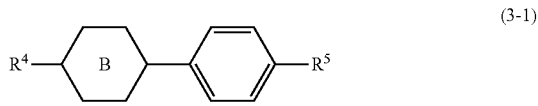
(3-1)

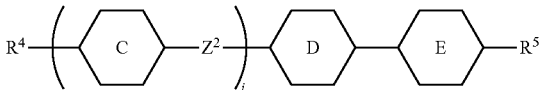
(3-2)

wherein $R^4$ and $R^5$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring B, ring C, ring D and ring E are each independently 1,4-cyclohexylene, 1,4-phenylene, 2-fluoro-1,4-phenylene, 3-fluoro-1,4-phenylene or 2,5-difluoro-1,4-phenylene; $Z^2$ is independently a single bond, ethylene, or carbonyloxy; and j is 1 or 2.

[10] The liquid crystal composition according to item 9, wherein the third component is at least one compound selected from the group of compounds represented by formulas (3-1-1) to (3-1-2) and formulas (3-2-1) to (3-2-9):

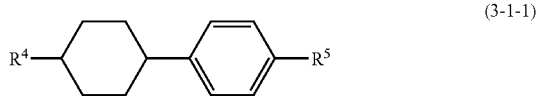
(3-1-1)

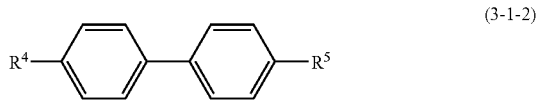
(3-1-2)

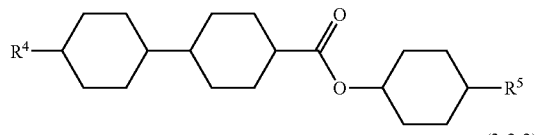
(3-2-1)

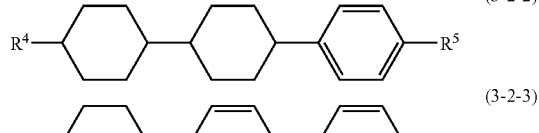
(3-2-2)

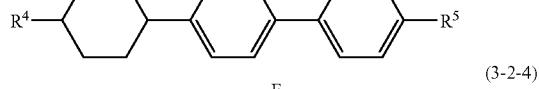
(3-2-3)

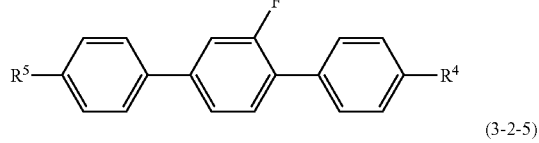
(3-2-4)

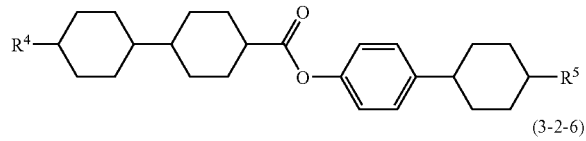
(3-2-5)

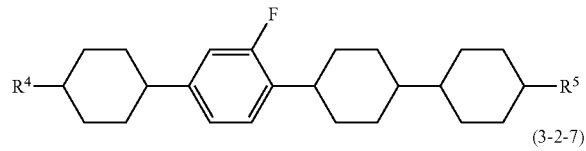
(3-2-6)

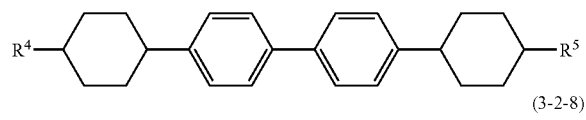
(3-2-7)

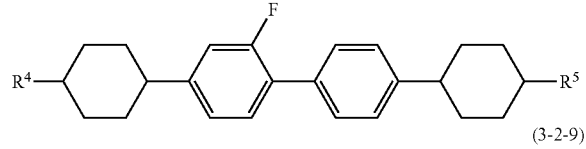
(3-2-8)

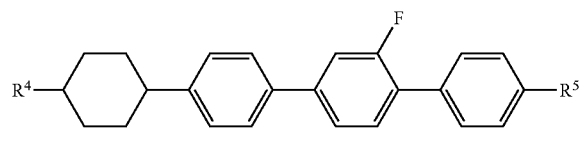
(3-2-9)

wherein $R^4$ and $R^5$ are each independently alkyl having 1 to 12 carbons, alkoxy having 1 to 12 carbons, or alkenyl having 2 to 12 carbons in which arbitrary hydrogen is replaced by fluorine.

[11] The liquid crystal composition according to item 10, wherein the third component is at least one compound selected from the group of compounds represented by formula (3-2-2).

[12] The liquid crystal composition according to item 10, wherein the third component is a mixture of at least one compound selected from the group of compounds represented by formula (3-2-2) and at least one compound selected from the group of compounds represented by formula (3-2-4).

[13] The liquid crystal composition according to item 10, wherein the third component is a mixture of at least one compound selected from the group of compounds represented by formula (3-2-2) and at least one compound selected from the group of compounds represented by formula (3-2-5).

[14] The liquid crystal composition according to item 10, wherein the third component is a mixture of at least one compound selected from the group of compounds represented by formula (3-2-2) and at least one compound selected from the group of compounds represented by formula (3-2-9).

[15] The liquid crystal composition according to any one of items 9 to 14, wherein the ratio of the third component is in the range of approximately 5% to approximately 40% by weight based on the total weight of the liquid crystal composition.

[16] The liquid crystal composition according to any one of items 1 to 15 that further includes at least one compound selected from the group of compounds represented by formulas (4-1) and (4-2) as a fourth component:

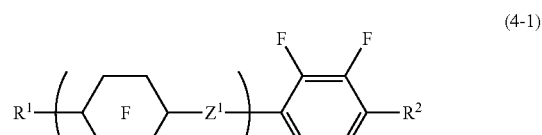
(4-1)

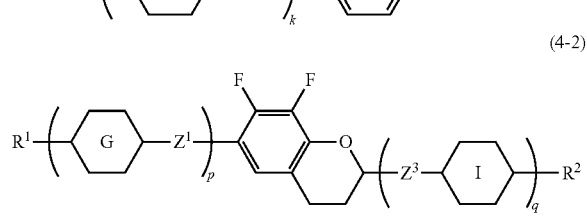
(4-2)

wherein $R^1$ and $R^2$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring F is independently tetrahydropyran-2,5-diyl, 1,4-cyclohexylene, or 1,4-phenylene; at least one ring D is tetrahydropyran-2,5-diyl, ring G and ring are each independently 1,4-cyclohexylene or 1,4-phenylene; $Z^1$ and $Z^3$ are each independently a single bond, ethylene, methyleneoxy or carbonyloxy; k is 1, 2 or 3; p and q are 0, 1, 2 or 3; and the sum of p and q is 3 or less.

[17] The liquid crystal composition according to item 16, wherein the fourth component is at least one compound selected from the group of compounds represented by formulas (4-1-1) to (4-1-7) and formulas (4-2-1) to (4-2-4):

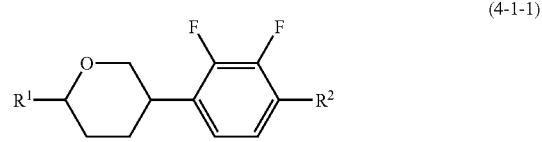
(4-1-1)

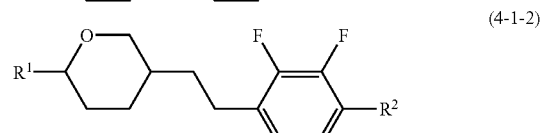
(4-1-2)

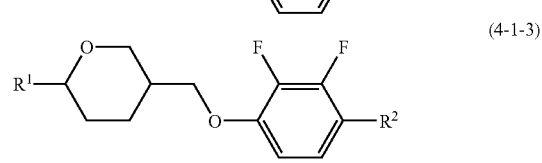
(4-1-3)

-continued

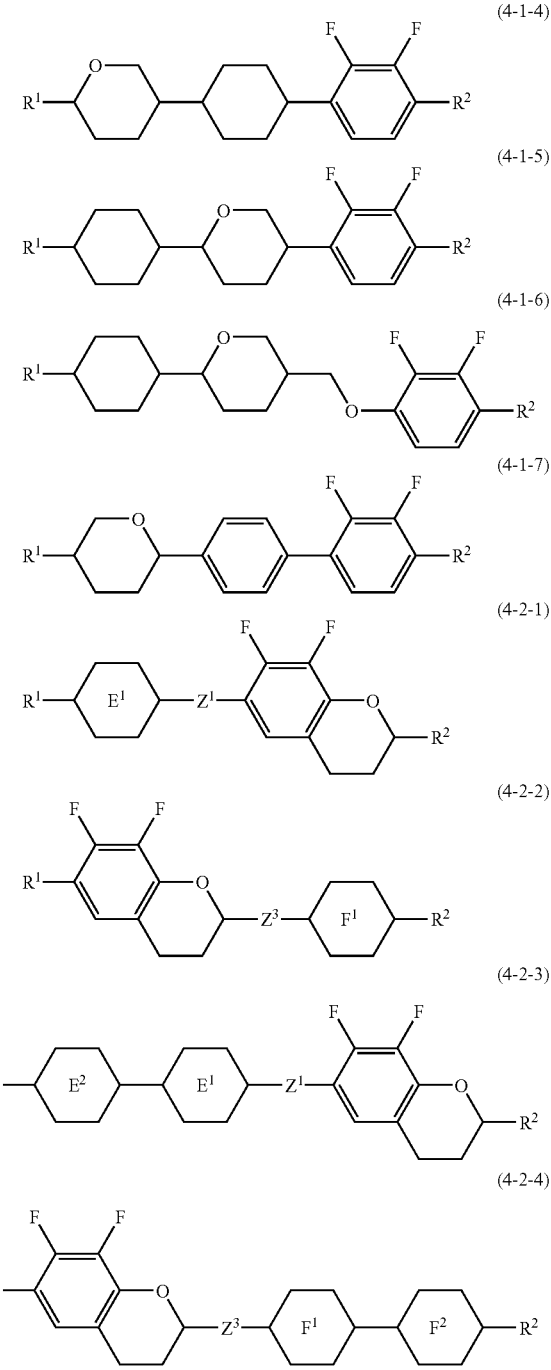

wherein R¹ and R² are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring E¹, ring E², ring F¹, ring F² are each independently 1,4-cyclohexylene or 1,4-phenylene; Z¹ and Z³ are each independently a single bond, ethylene, methyleneoxy or carbonyloxy.

[18] The liquid crystal composition according to item 17, wherein the fourth component is at least one compound selected from the group of compounds represented by formula (4-1-1).

[19] The liquid crystal composition according to item 17, wherein the fourth component is a mixture of at least one compound selected from the group of compounds represented by formula (4-1-1) and at least one compound selected from the group of compounds represented by formula (4-1-5).

[20] The liquid crystal composition according to item 17, wherein the fourth component is a mixture of at least one compound selected from the group of compounds represented by formula (4-1-5) and at least one compound selected from the group of compounds represented by formula (4-2-3).

[21] The liquid crystal composition according to any one of items 16 to 20, wherein the ratio of the fourth component is in the range of approximately 5% to approximately 50% by weight based on the total weight of the liquid crystal composition.

[22] The liquid crystal composition according to any one of items 1 to 21, wherein the maximum temperature of a nematic phase is approximately 70° C. or higher, the optical anisotropy (25° C.) at a wavelength of 589 nm is approximately 0.08 or more, and the dielectric anisotropy (25° C.) at a frequency of 1 kHz is approximately −2 or less.

[23] A liquid crystal display device that includes the liquid crystal composition according to any one of items 1 to 22.

[24] The liquid crystal display device according to item 23 wherein an operating mode of the liquid crystal display device is a VA mode, an IPS mode or a PSA mode, and a driving mode of the liquid crystal display device is an active matrix mode.

The invention further includes the following items: (1) the composition described above that further includes an optically active compound; (2) the composition described above that further includes an additive, such as an antioxidant, an ultraviolet light absorbent and/or a antifoaming agent; (3) an AM device that includes the composition described above; (4) a device having a mode of TN, ECB, OCB, IPS, VA or PSA that includes the composition described above; (5) a device having a transmission type that includes the composition described above; (6) use of the composition described above as a composition having a nematic phase; and (7) use as an optically active composition by adding an optically active compound to the composition described above.

The composition of the invention will be explained in the following order. First, the constitution of component compounds in the composition will be explained. Second, main characteristics of the component compounds and main effects of the compounds on the composition will be explained. Third, combinations of components in the composition, desirable ratios of the component compounds and the basis thereof will be explained. Fourth, a desirable embodiment of the component compounds will be explained. Fifth, examples of the component compounds will be shown. Sixth, additives that may be mixed into the composition will be explained. Seventh, methods for synthesizing the component compound will be explained. Last, use of the composition will be explained.

First, the constitution of component compounds in the composition will be explained. The composition of the invention is classified into the composition A and the composition B. The composition A may further contain other liquid crystal compounds, an additive, an impurity, and so forth. The "other liquid crystal compounds" are different from the compound (1), the compound (2), the compound (3-1), the compound (3-2), the compound (4-1) and the compound (4-2). Such compounds are mixed into the composition in order to further adjust the characteristics of the composition. Of the other liquid crystal compounds, the amount of cyano compound is preferably small in view of its stability to heat or ultraviolet light. A more desirable ratio of the cyano compound is approximately 0% by weight. The additive includes an optically active compound, an antioxidant, an ultraviolet light absorbent, a coloring matter, a antifoaming agent, a polymerizable compound, and a polymerization initiator. The impurity is a compound and so forth contaminated in a process such as the synthesis of component compounds. Even in the case where the compound is a liquid crystal compound, it is classified into an impurity herein.

The composition B is essentially consisting of compounds selected from the group of the compound (1), the compound (2), the compound (3-1), the compound (3-2), the compound (4-1) and the compound (4-2). The term "essentially" means that the composition may contain an additive and an impurity, but does not contain the other liquid crystal compounds which are different from these compounds. The number of components in the composition B is smaller than in the composition A. The composition B is preferable to the composition A in view of cost reduction. The composition A is preferable to the composition B in view of the fact that physical properties can be further adjusted by mixing the other liquid crystal compounds.

Second, main characteristics of the component compounds and main effects of the compounds on the composition will be explained. The main characteristics of the component compounds are summarized in Table 2 on the basis of the effects of the invention. In Table 2, the symbol L stands for "large" or "high", the symbol M stands for "a middle degree", and the symbol S stands for "small" or "low." The symbols L, M and S are classified on the basis of a qualitative comparison among the component compounds, and zero means that "a value is nearly zero."

TABLE 2

Characteristics of Compounds

| | Compounds | | | |
|---|---|---|---|---|
| | Compound (1) | Compound (2) | Compound (3-1) Compound (3-2) | Compound (4-1) Compound (4-2) |
| Maximum Temperature | S-M | M | S-L | S-M |
| Viscosity | M | S | S-M | M-L |
| Optical Anisotropy | M-L | S | M-L | M-L |
| Dielectric Anisotropy | M-L[1)] | 0 | 0 | L[1)] |
| Specific Resistance | L | L | L | L |

[1)]Values of dielectric anisotropy are negative and the symbols show the magnitude of absolute values.

Main effects of the component compounds on the characteristics of the composition upon mixing the component compounds to the composition are as follows. The compound (1) increases an absolute value of the dielectric anisotropy, and decreases the minimum temperature. The compound (2) decreases the viscosity. The compounds (3-1) and (3-2) increase the maximum temperature, or decrease the minimum temperature. The compounds (4-1) and (4-2) increase an absolute value of the dielectric anisotropy.

Third, combinations of the components in the composition, desirable ratios of the component compounds and the basis thereof will be explained. The combinations of the components in the composition is the first and second components, the first, second and third components, the first, second and fourth components, and the first, second, third and fourth components. A desirable combination of the components in the composition is the first, second and third components, and the first, second, third and fourth components.

A desirable ratio of the first component is approximately 5% by weight or more for increasing an absolute value of the dielectric anisotropy, and is approximately 60% by weight or less for decreasing the minimum temperature. A more desirable ratio is in the range of approximately 10% to approximately 60% by weight. An especially desirable ratio is in the range of approximately 10% to approximately 55% by weight.

A desirable ratio of the second component is approximately 5% by weight or more for decreasing the viscosity, and approximately 40% or less increasing an absolute value of the dielectric anisotropy. A more desirable ratio is in the range of approximately 5% to approximately 35% by weight. Especially desirable ratio is in the range of approximately 10% to approximately 35% by weight.

A desirable ratio of the third component is approximately 5% by weight or more for increasing the maximum temperature or is approximately 5% by weight or more for decreasing the minimum temperature, and is approximately 40% by weight or less for increasing the absolute value of dielectric anisotropy. A more desirable ratio is in the range of approximately 5% to approximately 35% by weight. An especially desirable ratio is in the range of approximately 5% to approximately 35% by weight.

A desirable ratio of the fourth component is approximately 5% by weight or more for increasing an absolute value of the dielectric anisotropy, and is approximately 50% by weight or less for decreasing the viscosity. A more desirable ratio is in the range of approximately 5% to approximately 45% by weight. An especially desirable ratio is in the range of approximately 5% to approximately 40% by weight.

Fourth, a desirable embodiment of the component compounds will be explained. $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine. Desirable $R^1$ and $R^2$ are each independently alkyl having 1 to 12 carbons for increasing the stability to ultraviolet ray or heat, and is alkoxy having 2 to 12 carbons for increasing the absolute value of the dielectric anisotropy. $R^3$ is alkyl having 1 to 12 carbons, alkoxy having 2 to 12 carbons, or alkenyl having 2 to 12 carbons in which arbitrary hydrogen is replaced by fluorine. Desirable $R^3$ is alkyl having 1 to 12 carbons for increasing the stability to ultraviolet light or heat. $R^4$ and $R^5$ are each independently alkyl having 1 to 12 carbons, alkoxy having 1 to 12 carbons, alkenyl having 2 to 11 carbons, or alkenyl having 2 to 12 carbons in which arbitrary hydrogen is replaced by fluorine. Desirable $R^4$ is alkenyl having 2 to 12 carbons for decreasing the minimum temperature. Desirable $R^5$ is alkyl having 1 to 12 carbons for increasing the stability to ultraviolet ray or heat.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH═CH— in the alkenyl depends on the position of a double bond. Trans is preferable in the alkenyl such as 1-propenyl, 1-butenyl, 1-pentenyl, 1-hexenyl, 3-pentenyl, and 3-hexenyl for decreasing the viscosity and so forth. C is preferable in the alkenyl such as 2-butenyl, 2-pentenyl and 2-hexenyl. In the alkenyl, a straight-chain alkenyl is preferable to a branched alkenyl.

Desirable examples of alkenyl in which arbitrary hydrogen is replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. More desirable examples are 2,2-difluoro-vinyl and 4,4-difluoro-3-butenyl for decreasing the viscosity.

Ring A is 1,4-cyclohexylene or 1,4-phenylene, arbitrary two rings A may be identical or different when m is 2 or 3. Desirable ring A is 1,4-cyclohexylene for decreasing the optical anisotropy. Ring B, ring C, ring D or ring E is each independently 1,4-cyclohexylene, 1,4-phenylene, 2-fluoro-1,4-phenylene, 3-fluoro-1,4-phenylene or 2,5-difluoro-1,4-phenylene, and arbitrary two rings C may be identical or different when j is 2. Desirable ring B is 1,4-cyclohexylene for decreasing the minimum temperature, or 1,4-phenylene for increasing the optical anisotropy. Desirable ring C, ring D or ring E is each independently 1,4-cyclohexylene for decreasing the viscosity. Ring F is independently tetrahydropyran-2,5-diyl, 1,4-cyclohexylene or 1,4-phenylene. At least one ring F is tetrahydropyran-2,5-diyl. Arbitrary two rings F may be identical or different when k is 2 or 3. Desirable ring F is tetrahydropyran-2,5-diyl for increasing the absolute value of dielectric anisotropy. Tetrahydropyran-2,5-diyl is

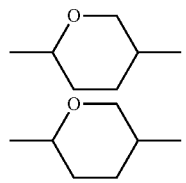

, desirably

Ring G, ring $G^1$, ring $G^2$, ring I, ring $I^1$ and ring $I^2$ are each independently 1,4-cyclohexylene or 1,4-phenylene; arbitrary two ring G may be same or different when p is 2 or 3; arbitrary two ring I may be same or different when q is 2 or 3. Desirable ring G, ring $G^1$, ring $G^2$, ring I, ring $I^1$ or ring $I^2$ are 1,4-cyclohexylene for decreasing the optical anisotropy.

$Z^1$ and $Z^3$ are each independently a single bond, ethylene, methyleneoxy or carbonyloxy; and arbitrary two $Z^1$ may be identical or different when m, k and p are 2 or 3. Desirable $Z^1$ and $Z^3$ are a single bond, methyleneoxy for increasing the absolute value of dielectric anisotropy. $Z^2$ is a single bond, ethylene or carbonyloxy; and two arbitrary $Z^2$ may be identical or different when j is 2. Desirable $Z^2$ is a single bond for decreasing the viscosity.

$X^1$ and $X^2$ are each independently fluorine or chlorine. Desirable $X^1$ or $X^2$ are fluorine for decreasing the viscosity.

m is 1, 2 or 3. Desirable m is 1 for decreasing the minimum temperature, and is 2 for increasing the maximum temperature. J is 1 or 2. Desirable j is 1 for decreasing the minimum temperature. k is 1, 2 or 3. Desirable k is 2 for decreasing the minimum temperature. p and q are each independently 0, 1, 2 or 3, and the sum of p and q is three or less. Desirable P is 2 for increasing the maximum temperature. Desirable q is 0 for decreasing the minimum temperature.

Fifth, examples of the component compounds will be shown.

In the desirable compounds described below $R^6$ is a straight-chain alkyl having 1 to 12 carbons or a straight-chain alkoxy having 1 to 12 carbons. $R^7$ and $R^8$ are each independently a straight-chain alkyl having 1 to 12 carbons, or a straight-chain alkenyl having 1 to 12 carbons. In these compounds, trans is preferable to cis for increasing the maximum temperature with regard to the configuration of 1,4-cyclohexylene.

Desirable compound (1) are the compounds (1-1-1) to (1-7-1). More desirable compound (1) are the compounds (1-1-1), (1-3-1), (1-4-1), (1-6-1) and (1-7-1). Especially desirable compound (1) are the compounds (1-1-1), (1-4-1) and (1-7-1). Desirable compound (2) is the compound (2-1). Desirable compound (3-1) are the compounds (3-1-1-1) and (3-1-2-1). Desirable compound (3-2) are the compounds (3-2-1-1) to (3-2-9-1). More desirable compound (3-2) are the compounds (3-2-2-1), (3-2-4-1), (3-2-5-1), (3-2-6-1), and (3-2-9-1). Especially desirable compound (3-2) are the compounds (3-2-2-1), (3-2-5-1) and (3-2-9-1). Desirable compound (4-1) are the compounds (4-1-1-1) and (4-1-7-1). More desirable compound (4-1) are the compounds (4-1-1-1), (4-1-3-1), (4-1-5-1) and (4-1-6-1). Especially desirable compound (4-1) are the compounds (4-1-1-1) and (4-1-5-1). Desirable compound (4-2) are the compounds (4-2-1-1), (4-2-1-2), (4-2-2-1), (4-2-3-1) to (4-2-3-5), (4-2-4-1), and (4-2-4-2). More desirable compound (4-2) are the compounds (4-2-1-2) (4-2-3-1), (4-2-3-3) and (4-2-4-1). Especially desirable compound (4-2) are the compounds (4-2-1-2) and (4-2-3-3).

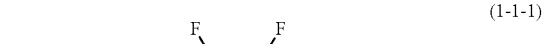

(1-1-1)

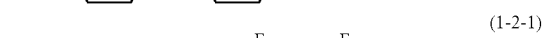

(1-2-1)

(1-3-1)

(1-4-1)

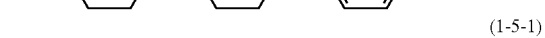

(1-5-1)

(1-6-1)

(1-7-1)

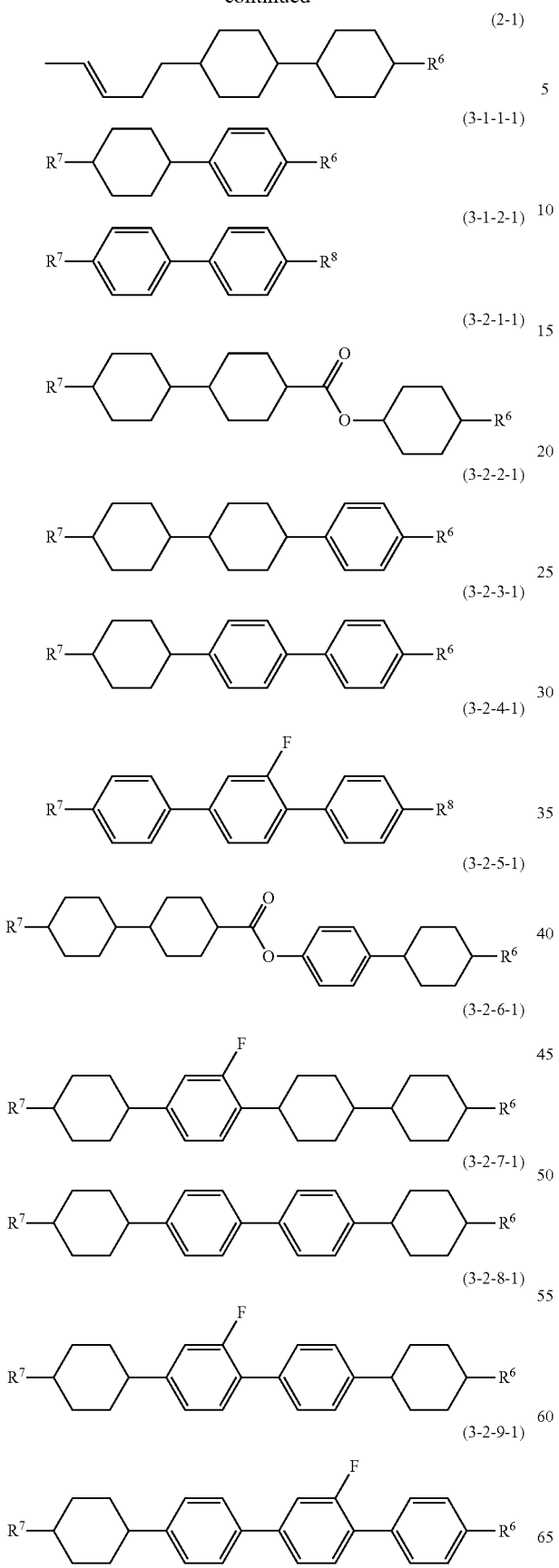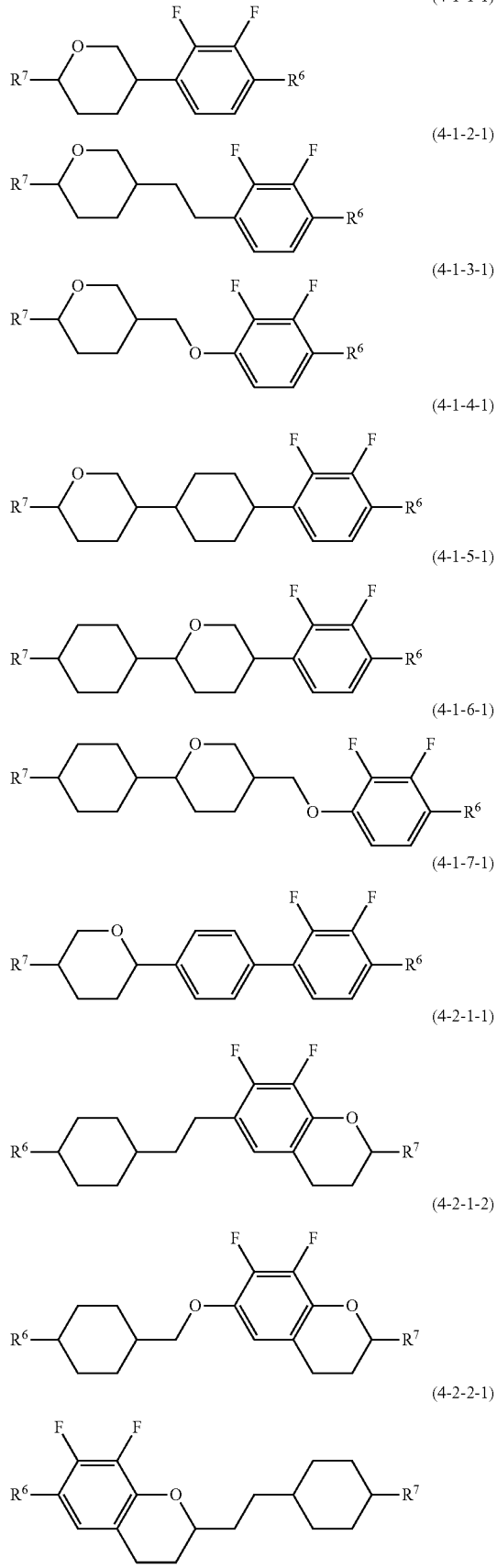

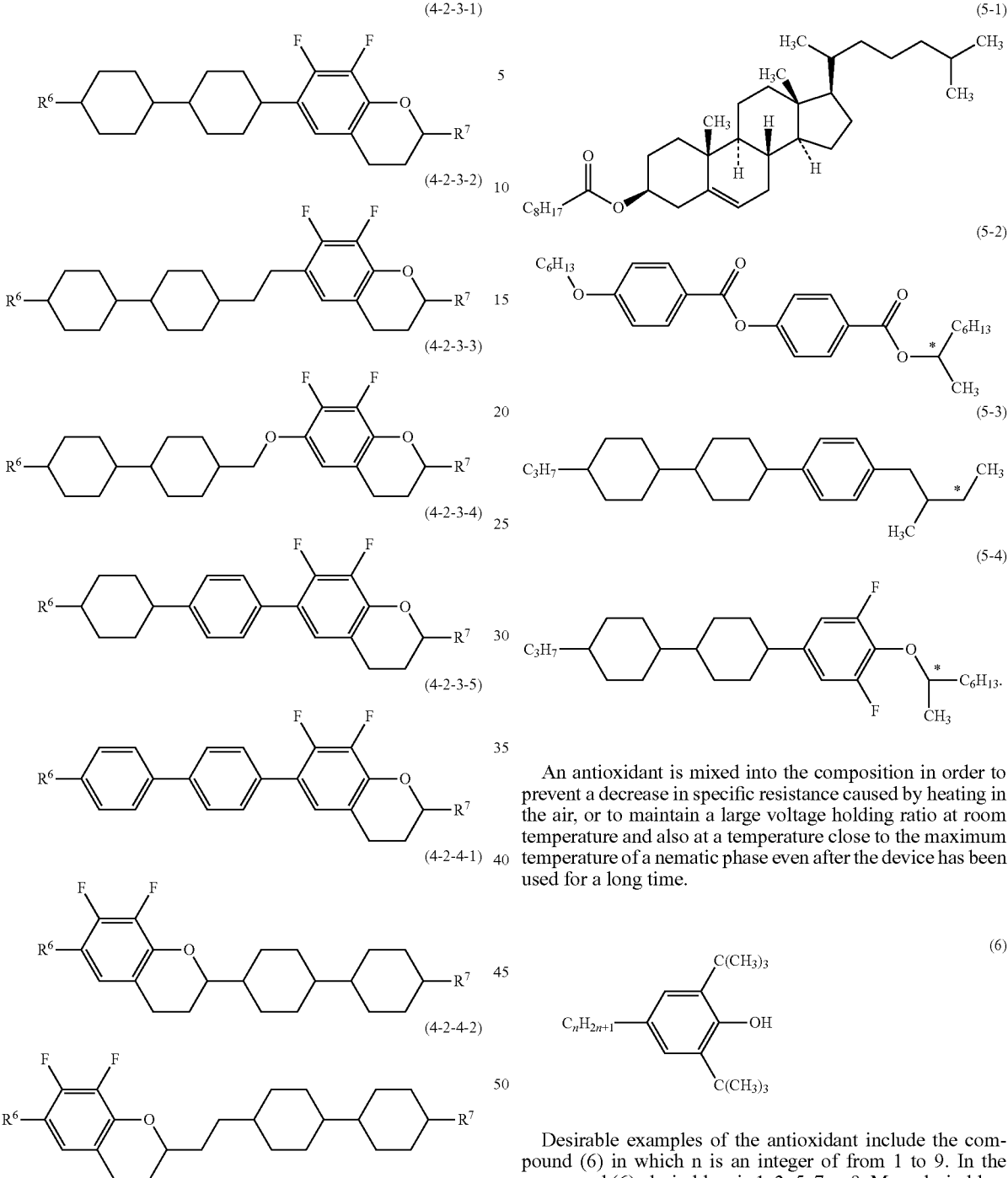

Sixth, additives which may be mixed into the composition will be explained. The additives include an optically active compound, an antioxidant, and ultraviolet light absorbent, a coloring matter, a antifoaming agent, a polymerizable compound, and a polymerization initiator. The optically active compound is mixed into the composition for the purpose of inducing a helical structure and giving a twist angle in liquid crystals. Examples of the optically active compound include the compounds (5-1) to (5-4) below. A desirable ratio of the optically active compound is approximately 5% by weight or less, and a more desirable ratio is in the range of approximately 0.01% to approximately 2% by weight.

An antioxidant is mixed into the composition in order to prevent a decrease in specific resistance caused by heating in the air, or to maintain a large voltage holding ratio at room temperature and also at a temperature close to the maximum temperature of a nematic phase even after the device has been used for a long time.

Desirable examples of the antioxidant include the compound (6) in which n is an integer of from 1 to 9. In the compound (6), desirable n is 1, 3, 5, 7 or 9. More desirable n is 1 or 7. The compound (6) in which n is 1, is effective in preventing a decrease of specific resistance caused by heating in the air because it has a large volatility. The compound (6) in which n is 7, is effective in maintaining a high voltage holding ratio at room temperature and also at a temperature close to the maximum temperature of a nematic phase even after the device has been used for a long time, because it has a small volatility. A desirable ratio of the antioxidant is approximately 50 ppm or more for achieving its effect and is approximately 600 ppm or less for avoiding a decrease of the maximum temperature or avoiding an increase of the minimum temperature. A more desirable ratio is in the range of approximately 100 ppm to approximately 300 ppm.

Desirable examples of the ultraviolet ray absorbent include a benzophenone derivative, a benzoate derivative and a triazole derivative. A light stabilizer such as an amine having steric hindrance is also desirable. A desirable ratio of the ultraviolet ray absorbent and the stabilizer is approximately 50 ppm or more for achieving its effect and is approximately 10,000 ppm or less for avoiding a decrease of the maximum temperature or avoiding an increase of the minimum temperature. A more desirable ratio thereof is in the range of approximately 100 ppm to approximately 10,000 ppm.

A dichroic dye such as an azo dye or an anthraquinone dye is mixed into the composition for adjusting to a device having a guest host (GH) mode. A desirable ratio of the coloring matter is in the range of approximately 0.01% to approximately 10% by weight. The antifoaming agent such as dimethyl silicone oil or methyl phenyl silicone oil is mixed into the composition for preventing foam formation. A desirable ratio of the antifoaming agent is approximately 1 ppm or more for achieving its effect and is approximately 1,000 ppm or less for avoiding a poor display. A more desirable ratio is in the range of approximately 1 ppm to approximately 500 ppm.

A polymerizable compound is mixed into the composition for adjusting the composition into a device having a PSA (polymer sustained alignment) mode. Desirable examples of the polymerizable compound include compounds having a polymerizable group, such as acrylates, methacrylates, vinyl compounds, vinyloxy compounds, propenyl ethers, epoxy compounds (oxirane, oxetane) and vinyl ketones. Especially desirable examples of the polymerizable compound are acrylate derivatives or methacrylate derivatives. A desirable ratio of the polymerizable compound is approximately 0.05% by weight or more for achieving its effect and is approximately 10% by weight or less for avoiding a poor display. A more desirable ratio is in the range of approximately 0.1% to approximately 2% by weight. The polymerizable compound is preferably polymerized on irradiation with ultraviolet light and so forth in the presence of a suitable initiator such as a photopolymerization initiator. Suitable conditions for polymerization, suitable types of the initiator and suitable amount thereof are known to a person skilled in the art and are described in the literature. For example, Irgacure 651 (registered trademark), Irgacure 184 (registered trademark) or Darocure 1173 (registered trademark) (Ciba Japan K.K.) which is photopolymerization initiator is suitable for radical polymerization. The polymerizable compound includes the photopolymerization initiator preferably in the range of approximately 0.1% to approximately 5% by weight, and most preferably in the range of approximately 1% to approximately 3% by weight.

Seventh, methods for synthesizing the component compounds will be explained. These compounds can be synthesized by known methods. The synthesizing methods will be exemplified as follows. The compound (1-1-1) and (1-4-1) are synthesized by a method with some modifications of that described in JP H2-503441 A. The compound (2-1) is synthesized by the method described in JP S61-27928 A. The compound (3-2-4-1) is synthesized by the method described in JP 2006-503130 A. The compound (4-1-5-1) is synthesized by the method described in JP 2000-008040 A. The compound (4-2-2-1) is synthesized by the method described in JP 2005-35986 A. An antioxidant is commercially available. The compound of formula (6) in which n is 1 is available from Sigma-Aldrich Corporation. The compound (6), in which n is 7 is synthesized according to the method described in U.S. Pat. No. 3,660,505.

The compounds for which synthesizing methods were not described above can be synthesized according to the methods described in ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), NEW EXPERIMENTAL CHEMISTRY COURSE (Shin Jikken Kagaku Kouza, in Japanese title) (Maruzen, Inc.), and so forth. The composition is prepared according to known methods using the compounds thus obtained. For example, the component compounds are mixed and dissolved each other by heating.

Last, use of the composition will be explained. Most of the compositions have a minimum temperature of approximately $-10°$ C. or lower, a maximum temperature of approximately $70°$ C. or higher, and an optical anisotropy in the range of approximately 0.07 to approximately 0.20. The device containing the composition has a high voltage holding ratio. The composition is suitable for an AM device. The composition is suitable especially for an AM device having a transmission type. The composition having an optical anisotropy in the range of approximately 0.08 to approximately 0.25 and of approximately 0.10 to approximately 0.30 may be prepared by controlling ratios of the component compounds or by mixing other liquid crystal compounds. The composition can be used as a composition having a nematic phase and as an optically active composition by adding an optically active compound.

The composition can be used for an AM device. It can also be used for a PM device. The composition can also be used for the AM device and the PM device having a mode such as PC, TN, STN, ECB, OCB, IPS, VA or PSA. It is especially desirable to use the composition for the AM device having the IPS or VA mode. These devices may be of a reflection type, a transmission type or a semi-transmission type. It is desirable to use the composition for a device having the transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three-dimensional network-polymer is formed in the composition.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

A composition and a compound were a subject for measurement in order to evaluate characteristics of the composition and the compound to be included in the composition. When the subject for measurement was a composition, the composition itself was measured as a sample, and the value obtained was described here. When the subject for measurement was a compound, a sample for measurement was prepared by mixing the compound (15% by weight) and mother liquid crystals (85% by weight). Characteristic values of the compound were calculated from values obtained by measurement, according to a method of extrapolation. That is: (extrapolated value)=[(measured value of a sample for measurement)$-0.85\times$(measured value of mother liquid crystals)]/0.15. When a smectic phase (or crystals) separated out at this ratio at $25°$ C., the ratio of the compound and the mother liquid crystals was changed step by step in the order of (10% by weight/90% by weight), (5% by weight/95% by weight), (1% by weight/99% by weight). Values of a maximum temperature, optical anisotropy, viscosity and dielectric anisotropy with regard to the compound were obtained by the extrapolation.

The components and their ratios of the mother liquid crystals were as follows.

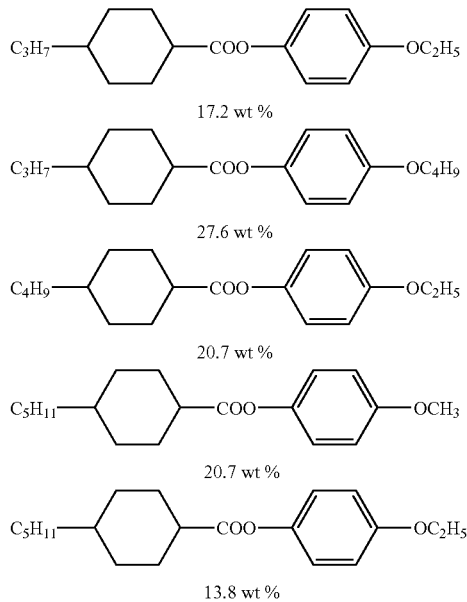

17.2 wt %

27.6 wt %

20.7 wt %

20.7 wt %

13.8 wt %

Characteristics were measured according to the following methods. Most methods are described in the Standards of Electronic Industries Association of Japan, EIAJ·ED-2521 A or those with some modifications.

Maximum Temperature of a Nematic Phase (NI; ° C.): A sample was placed on a hot plate in a melting point apparatus equipped with a polarizing microscope and was heated at the rate of 1° C. per minute. Temperature was measured when part of the sample began to change from a nematic phase to an isotropic liquid. A higher limit of the temperature range of a nematic phase may occasionally be abbreviated to "a maximum temperature."

Minimum Temperature of a Nematic Phase (Tc; ° C.): A sample having a nematic phase was put in glass vials and then kept in freezers at temperatures of 0° C., −10° C., −20° C., −30° C. and −40° C. for 10 days, and then the liquid crystal phase was observed. For example, when the sample remained the nematic phase at −20° C. and changed to crystals or a smectic phase at −30° C., Tc was expressed as ≦−20° C. A lower limit of the temperature range of a nematic phase may occasionally be abbreviated to "a minimum temperature."

Viscosity (bulk viscosity; η; measured at 20° C.; mPa·s): Viscosity was measured by use of an E-type viscometer.

Optical Anisotropy (refractive index anisotropy; Δn; measured at 25° C.): Measurement was carried out by use of an Abbe refractometer with a polarizing plate mounted on the ocular, on irradiation with light at a wavelength of 589 nm. The surface of the main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. A value of optical anisotropy was calculated from the equation: $\Delta n = n\| - n\bot$.

Dielectric Anisotropy (Δ∈; measured at 25° C.): The value of dielectric anisotropy was calculated from the equation: $\Delta\in = \in\| - \in\bot$. Dielectric constants (∈∥ and ∈⊥) were measured as follows.

1) Measurement of a dielectric constant (∈∥): A solution of octadecyltriethoxysilane (0.16 mL) in ethanol (20 mL) was applied to a thoroughly cleaned glass substrate. The glass substrate was rotated with a spinner, and then heated at 150° C. for one hour. A sample was put in a VA device having the distance between two glass substrates (cell gap) of 4 and then the device was sealed with an adhesive curable on irradiation with ultraviolet light. Sine waves (0.5 V, 1 kHz) were impressed onto the device, and a dielectric constant (∈∥) in a major axis direction of liquid crystal molecules was measured after 2 seconds.

2) Measurement of a dielectric constant (∈⊥): A polyimide solution was applied to a thoroughly cleaned glass substrate. The glass substrate was heated, and then the alignment film obtained was subjected to a rubbing treatment. A sample was put in a TN device having the distance between two glass substrates (cell gap) of 9 μm and a twist angle of 80°. Sine waves (0.5 V, 1 kHz) were impressed onto the device, and a dielectric constant (∈⊥) in a minor axis direction of liquid crystal molecules was measured after 2 seconds.

Threshold Voltage (Vth; measured at 25° C.; V): Measurement was carried out with an LCD Evaluation System Model LCD-5100 made by Otsuka Electronics Co., Ltd. The light source was a halogen lamp. A sample was poured into a VA device having a normally black mode, in which the distance between two glass substrates (cell gap) was 4 μm and a rubbing direction was antiparallel, and then the device was sealed with an ultraviolet light-curable adhesive. Voltage to be impressed onto the device (60 Hz, rectangular waves) was stepwise increased in 0.02 V increments from 0 V up to 20 V. During the increase, the device was irradiated with light in a perpendicular direction, and the amount of light passing through the device was measured. A voltage-transmission curve was prepared, in which the maximum amount of light corresponded to 100% transmittance and the minimum amount of light corresponded to 0% transmittance. The threshold voltage was voltage at 10% transmittance.

Voltage Holding Ratio (VHR-1; measured at 25° C.; %): A TN device used for measurement had a polyimide-alignment film, and the distance between two glass substrates (cell gap) was 5 A sample was poured into the device, and then the device was sealed with a polymerizable adhesive on irradiation with ultraviolet light. The TN device was impressed and charged with pulse voltage (60 microseconds at 5 V). A decreasing voltage was measured for 16.7 milliseconds with a High Speed Voltmeter, and the area A between a voltage curve and a horizontal axis in a unit cycle was obtained. The area B was an area without decreasing. The voltage holding ratio was a percentage of the area A to the area B.

Voltage Holding Ratio (VHR-2; measured at 80° C.; %): A TN device used for measurement had a polyimide-alignment film, and the distance between two glass substrates (cell gap) was 5 μm. A sample was poured into the device, and then the device was sealed with a polymerizable adhesive on irradiation with ultraviolet light. The TN device was impressed and charged with pulse voltage (60 microseconds at 5 V). A decreasing voltage was measured for 16.7 milliseconds with a High Speed Voltmeter and the area A between a voltage curve and a horizontal axis in a unit cycle was obtained. The area B was an area without decreasing. The voltage holding ratio was a percentage of the area A to the area B.

Voltage Holding Ratio (VHR-3; measured at 25° C.; %): A voltage holding ratio was measured after irradiation with ultraviolet light, evaluating stability to ultraviolet light. A composition having a large VHR-3 has a high stability to ultraviolet light. A TN device used for measurement had a polyimide-alignment film and the cell gap was 5 μm. A sample was poured into the device, and then the device was irradiated with light for 20 minutes. The light source was an ultra high-pressure mercury lamp USH-500D (produced by Ushio, Inc.), and the distance between the device and the light source was 20 cm. In the measurement of VHR-3, a decreasing voltage was measured for 16.7 milliseconds. The value of VHR-3 is preferably 90% or more, and more preferably 95% or more.

Voltage Holding Ratio (VHR-4; measured at 25° C.; %): A TN device into which a sample was poured was heated in a constant-temperature bath at 80° C. for 500 hours, and then voltage holding ratio was measured, evaluating stability to heat. A composition having a large VHR-4 has a high stability to heat. In the measurement of VHR-4, a decreasing voltage was measured for 16.7 milliseconds.

Response Time (τ; measured at 25° C.; millisecond): Measurement was carried out with an LCD Evaluation System Model LCD-5100 made by Otsuka Electronics Co., Ltd. The light source was a halogen lamp. The low-pass filter was set at 5 kHz. A sample was poured into a VA device having a normally black mode, in which the cell gap between two glass substrates was 4 and a rubbing direction was antiparallel, and then the device was sealed with an ultraviolet light-curable adhesive. Rectangular waves (60 Hz, 10 V, 0.5 second) were impressed to the device. The device was simultaneously irradiated with light in a perpendicular direction, and the amount of light passing through the device was measured. The maximum amount of light corresponded to 100% transmittance, and the minimum amount of light corresponded to 0% transmission. The response time was the period of time required for the change in transmittance from 90% to 10% (fall time: millisecond).

Specific resistance (ρ; measured at 25° C.; Ω cm): A sample of 1.0 milliliters was poured into a vessel equipped with electrodes. DC voltage (10V) was applied to the vessel, and the DC current was measured after 10 seconds. The specific resistance was calculated according to the following formula. (specific resistance)=[(voltage)×(electric capacity of vessel)]/[(DC current)×(dielectric constant in a vacuum)].

Gas chromatographic analysis: A Gas Chromatograph Model GC-14B made by Shimadzu was used for measurement. The carrier gas was helium (2 milliliters per minute). The evaporator and the detector (FID) were set up at 280° C. and 300° C., respectively. Capillary column DB-1 (length 30 meters, bore 0.32 millimeter, film thickness 0.25 micrometer, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was prepared in an acetone solution (0.1% by weight), and 1 microliter of the solution was injected into the evaporator. A recorder used was a Chromatopac Model C-R5A made by Shimadzu or its equivalent. The gas chromatogram obtained showed retention times of peaks and peak areas corresponding to the component compounds.

Solvents for diluting the sample may also be chloroform, hexane, and so forth. The following capillary columns may also be used in order to separate the component compounds: HP-1 made by Agilent Technologies Inc. (length 30 meters, bore 0.32 millimeter, film thickness 0.25 micrometer), Rtx-1 made by Restek Corporation (length 30 meters, bore 0.32 millimeter, film thickness 0.25 micrometer), and BP-1 made by SGE International Pty. Ltd. (length 30 meters, bore 0.32 millimeter, film thickness 0.25 micrometer). A capillary column CBP1-M50-025 (50 meters, bore 0.25 millimeter, film thickness 0.25 micrometer) made by Shimadzu Corporation may be used for the purpose of avoiding an overlap of peaks of the compounds.

The ratio of the liquid crystal compounds included in the composition may be calculated according to the following method. The liquid crystal compounds are detected by use of a gas chromatograph. The area ratio of peaks in the gas chromatogram corresponds to the ratio (in moles) of the liquid crystal compounds. When the capillary columns described above are used, the correction coefficient of respective liquid crystal compounds may be regarded as one. Accordingly, the ratio (percent by weight) of the liquid crystal compound can be calculated from the peak area ratio.

The invention will be explained in detail by way of Examples. The invention is not limited by Examples described below. The compounds described in Comparative Examples and Examples were expressed as symbols according to the definition in the following Table 3. In Table 3, the configuration of 1,4-cyclohexylene is trans. A parenthesized number next to the symbolized compound in Examples correspond to a compound number. The symbol (–) means other liquid crystal compounds. Ratios (percentage) of liquid crystal compounds mean the percentages by weight (% by weight) based on the total weight of the liquid crystal composition. The liquid crystal composition further includes an impurity. Last, characteristics of the composition are summarized.

TABLE 3

Method of Description of Compound using Symbols.

$$R-(A_1)-Z_1-\cdots-Z_n-(A_n)-R'$$

| | Symbol |
|---|---|
| 1) Left Terminal Group R— | |
| $C_nH_{2n+1}-$ | n- |
| $C_nH_{2n+1}O-$ | nO— |
| $C_mH_{2m+1}OC_nH_{2n}-$ | mOn- |
| $CH_2=CH-$ | V— |
| $C_nH_{2n+1}-CH=CH-$ | nV— |
| $CH_2=CH-C_nH_{2n}-$ | Vn- |
| $C_mH_{2m+1}-CH=CH-C_nH_{2n}-$ | mVn- |
| $CF_2=CH-$ | VFF— |
| $CF_2=CH-C_nH_{2n}-$ | VFFn- |
| 2) Right Terminal Group —F | |
| $-C_nH_{2n+1}$ | -n |
| $-OC_nH_{2n+1}$ | —On |
| $-CH=CH_2$ | —V |
| $-CH=CH-C_nH_{2n+1}$ | —Vn |
| $-C_nH_{2n}-CH=CH_2$ | -nV |
| $-CH=CF_2$ | —VFF |
| $-COOCH_3$ | -EMe |
| 3) Bonding group —Zn— | |
| $-C_2H_4-$ | 2 |
| $-COO-$ | E |
| $-CH=CH-$ | V |
| $-C\equiv C-$ | T |
| $-CF_2O-$ | X |
| $-CH_2O-$ | 1O |
| 4) Ring Structure -An- | |
| ⌬ (cyclohexylene) | H |

TABLE 3-continued

Method of Description of Compound using Symbols.

R—(A₁)—Z₁— · · · —Zₙ—(Aₙ)—R'

| Structure | Symbol |
|---|---|
| 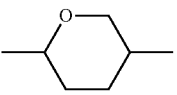 | Dh |
| 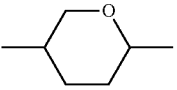 | dh |
| 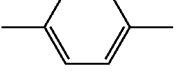 | B |
| 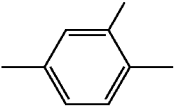 | B(F) |
| 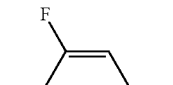 | B(2F) |
| 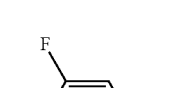 | B(2F,5F) |
| 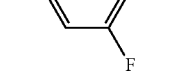 | B(2F,3F) |
|  | B(2F,3F,6Me) |
| 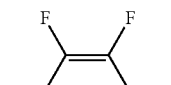 | B(2F,3Cl) |
| 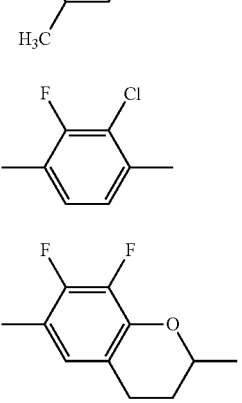 | Cro(7F,8F) |

5) Example of Description

Example 1 1V2-HH-3

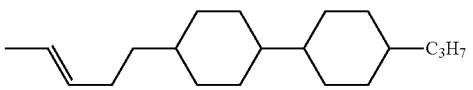

Example 2 3-HB(2F,3F)-O2

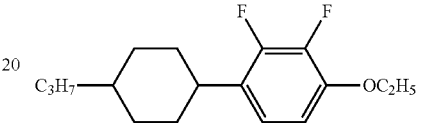

Example 3 3-HHB-1

Example 4 3-HDhB(2F,3F)-O4

Comparative Example 1

Example 1 was selected from compositions disclosed in JP H10-176167 A. The basis for the selection is that the composition contains the compound (1-1-1), the compound (1-4-1), the compound (3-1-1-1) and the compound (3-2-1-1). Since the response time was not described herein, the composition was prepared and measured by the method described above. The composition had the following components and characteristics.

| Compound | Code | % |
|---|---|---|
| 3-HB(2F,3F)-O2 | (1-1-1) | 12% |
| 5-HB(2F,3F)-O2 | (1-1-1) | 11% |
| 3-HHB(2F,3F)-O2 | (1-4-1) | 15% |
| 5-HHB(2F,3F)-O2 | (1-4-1) | 15% |
| 3-HHEH-3 | (3-2-1-1) | 5% |
| 3-HHEH-5 | (3-2-1-1) | 6% |
| 4-HHEH-3 | (3-2-1-1) | 6% |
| 3-HH-4 | (—) | 5% |
| 3-HH-5 | (—) | 5% |
| 3-HH-O1 | (—) | 6% |
| 3-HH-O3 | (—) | 6% |
| 3-HB-O1 | (3-1-1-1) | 4% |
| 3-HB-2 | (3-1-1-1) | 4% |

NI = 92.0° C.;
Δn = 0.076;
Δε = −3.6;
τ = 15.9 ms.

Comparative Example 2

Example 4 was selected from compositions disclosed in JP H11-140447 A. The basis for the selection is that the composition contains a compound similar to the compound (1-1-1), the compound (1-4-1) and has the smallest γ1. Since the response time was not described herein, the composition was prepared and measured by the method described above. The composition had the following components and characteristics.

| | | |
|---|---|---|
| V-HH-V1 | (—) | 24% |
| 3-HB(2F,3F)-O2 | (1-1-1) | 12% |
| 5-HB(2F,3F)-O2 | (1-1-1) | 12% |
| 3-HHB(2F,3F)-O2 | (1-4-1) | 14% |
| 5-HHB(2F,3F)-O2 | (1-4-1) | 13% |
| 3-HHB(2F,3F)-1 | (1-4-1) | 13% |
| 5-HHB(2F,3F)-1 | (1-4-1) | 12% |

NI = 88.5° C.;
Δn = 0.090;
Δε = −4.0;
τ = 14.4 ms.

Comparative Example 3

Example 18 was selected from compositions disclosed in JP 2001-354967 A. The basis for the selection is that the composition contains the compound (1-1-1), the compound (1-7-1) (3-2-3-1), and has the smallest γ1. Since the response time was not described herein, the composition was prepared and measured by the method described above. The composition had the following components and characteristics.

| | | |
|---|---|---|
| 3-HB(2F,3F)-O4 | (1-1-1) | 8% |
| 5-HB(2F,3F)-O2 | (1-1-1) | 10% |
| 5-HB(2F,3F)-O4 | (1-1-1) | 14% |
| 3-HBB(2F,3F)-O2 | (1-7-1) | 12% |
| 5-HXB(2F,3F)-1 | (—) | 5% |
| 3-HXB(2F,3F)-O4 | (—) | 5% |
| 3-HBB(2F,3F)-O4 | (1-7-1) | 12% |
| 3-HBB-2 | (3-2-3-1) | 9% |
| 3-HH-V1 | (—) | 10% |
| 3-HH-4 | (—) | 5% |
| 5-HH-V | (—) | 10% |

NI = 77.0° C.;
Δn = 0.102;
Δε = −3.3;
Vth = 2.14 V;
τ = 12.3 ms.

Example 1

| | | |
|---|---|---|
| 3-H2B(2F,3F)-O2 | (1-2-1) | 12% |
| 5-H2B(2F,3F)-O2 | (1-2-1) | 11% |
| V-HB(2F,3F)-O2 | (1-1-1) | 4% |
| 3-HHB(2F,3F)-O2 | (1-4-1) | 5% |
| 3-HBB(2F,3F)-O2 | (1-7-1) | 15% |
| 5-HBB(2F,3F)-O2 | (1-7-1) | 5% |
| 1V2-HH-1 | (2-1) | 19% |
| 1V2-HH-2 | (2-1) | 5% |
| 1V2-HH-3 | (2-1) | 10% |
| V2-BB-1 | (3-1-2-1) | 4% |
| V-HHB-1 | (3-2-2-1) | 10% |

NI = 72.2° C.;
Tc ≦ −20° C.;
Δn = 0.100;
η = 19.1 mPa·s;
Δε = −2.8;
τ = 10.2 ms;
Vth = 2.35 V;
VHR-1 = 99.2%;
VHR-2 = 98.0%;
VHR-3 = 98.2%.

Example 2

| | | |
|---|---|---|
| 3-HB(2F,3F)-O2 | (1-1-1) | 12% |
| V-HB(2F,3F)-O4 | (1-1-1) | 5% |
| 3-H1OB(2F,3F)-O2 | (1-3-1) | 8% |
| 3-HH1OB(2F,3F)-O2 | (1-6-1) | 4% |
| 1V2-HH-1 | (2-1) | 20% |
| 1V2-HH-3 | (2-1) | 8% |
| 3-HB-O2 | (3-1-1-1) | 7% |
| 1V2-BB-1 | (3-1-2-1) | 5% |
| 1V-HBB-2 | (3-2-3-1) | 4% |
| 2-BB(F)B-3 | (3-2-4-1) | 4% |
| 3-HHEBH-5 | (3-2-5-1) | 3% |
| 5-HB(F)BH-3 | (3-2-8-1) | 3% |
| 3-HDhB(2F,3F)-O2 | (4-1-5-1) | 8% |
| 3-HH2Cro(7F,8F)-5 | (4-2-3-2) | 3% |
| 3-HBCro(7F,8F)-5 | (4-2-3-4) | 3% |
| 3-BBCro(7F,8F)-5 | (4-2-3-5) | 3% |

NI = 71.0° C.;
Tc ≦ −20° C.;
Δn = 0.106;
Δε = −2.3;
τ = 11.1 ms;
VHR-1 = 99.1%;
VHR-2 = 98.1%;
VHR-3 = 98.2%.

Example 3

| | | |
|---|---|---|
| 3-HBB(2F,3F)-O2 | (1-7-1) | 13% |
| 1V2-HH-1 | (2-1) | 5% |
| 1V2-HH-3 | (2-1) | 6% |
| 7-HB-1 | (3-1-1-1) | 3% |
| 3-HHB-1 | (3-2-2-1) | 4% |
| 3-HHB-O1 | (3-2-2-1) | 4% |
| 1-BB(F)B-2V | (3-2-4-1) | 6% |
| 3-HB(F)HH-5 | (3-2-6-1) | 4% |
| 5-HBB(F)B-2 | (3-2-9-1) | 3% |
| 5-DhB(2F,3F)-O2 | (4-1-1-1) | 5% |
| 3-Dh2B(2F,3F)-O2 | (4-1-2-1) | 5% |
| 5-DhHB(2F,3F)-O2 | (4-1-4-1) | 4% |
| 3-H2Cro(7F,8F)-5 | (4-2-1-1) | 3% |
| 3-H1OCro(7F,8F)-5 | (4-2-1-2) | 4% |
| 3-HHCro(7F,8F)-5 | (4-2-3-1) | 3% |
| 2-HH-3 | (—) | 28% |

NI = 80.8° C.;
Tc ≦ −20° C.;
Δn = 0.095;
η = 18.8 mPa·s;
Δε = −2.3;
τ = 10.6 ms;
VHR-1 = 99.1%;
VHR-2 = 98.1%;
VHR-3 = 98.2%.

Example 4

| | | |
|---|---|---|
| 3-HB(2F,3F)-O4 | (1-1-1) | 8% |
| V-HHB(2F,3F)-O2 | (1-4-1) | 9% |
| V-HBB(2F,3F)-O2 | (1-7-1) | 4% |
| 1V2-HH-1 | (2-1) | 10% |
| 1V2-HH-3 | (2-1) | 5% |
| 3-HHEH-3 | (3-2-1-1) | 3% |
| 5-HBBH-3 | (3-2-7-1) | 3% |
| 3-Dh1OB(2F,3F)-O2 | (4-1-3-1) | 4% |
| 5-HDh1OB(2F,3F)-O2 | (4-1-6-1) | 6% |
| 3-dhBB(2F,3F)-O2 | (4-1-7-1) | 6% |
| 3-H2Cro(7F,8F)-5 | (4-2-1-1) | 3% |
| 2O-Cro(7F,8F)2H-3 | (4-2-2-1) | 3% |
| 2O-Cro(7F,8F)HH-5 | (4-2-4-1) | 3% |
| 3-Cro(7F,8F)2HH-5 | (4-2-4-2) | 3% |
| 3-HH-V | (—) | 20% |
| 5-HH-V | (—) | 7% |
| 1O1-HBBH-5 | (—) | 3% |

NI = 82.5° C.;
Tc ≦ −20° C.;
Δn = 0.087;
Δε = −3.0;
Vth = 2.28 V;
τ = 10.9 ms;
VHR-1 = 99.1%;
VHR-2 = 98.1%;
VHR-3 = 98.1%.

Example 5

| | | |
|---|---|---|
| V-HB(2F,3F)-O2 | (1-1-1) | 10% |
| V-HB(2F,3F)-O4 | (1-1-1) | 10% |
| 3-HHB(2F,3F)-O2 | (1-4-1) | 10% |
| 3-HH2B(2F,3F)-O2 | (1-5-1) | 4% |
| 3-HBB(2F,3F)-O2 | (1-7-1) | 12% |
| 5-HBB(2F,3F)-O2 | (1-7-1) | 6% |
| 1V2-HH-1 | (2-1) | 12% |
| 1V2-HH-2 | (2-1) | 4% |
| 3-HHB-3 | (3-2-2-1) | 4% |
| V2-BB(F)B-1 | (3-2-4-1) | 3% |
| 3-HH1OCro(7F,8F)-5 | (4-2-3-3) | 5% |
| 3-HH-V1 | (—) | 10% |
| 3-HH-4 | (—) | 5% |
| 3-HH-5 | (—) | 5% |

NI = 79.2° C.;
Tc ≦ −20° C.;
Δn = 0.098;
Δε = −3.1;
τ = 10.7 ms;
VHR-1 = 99.1%;
VHR-2 = 98.1%;
VHR-3 = 98.2%.

Example 6

| | | |
|---|---|---|
| 3-HHB(2F,3Cl)-O2 | (1) | 3% |
| 5-HHB(2F,3Cl)-O2 | (1) | 2% |
| 3-HB(2F,3F)-O2 | (1-1-1) | 10% |
| 5-HB(2F,3F)-O2 | (1-1-1) | 11% |
| 2-HBB(2F,3F)-O2 | (1-7-1) | 5% |
| 3-HBB(2F,3F)-O2 | (1-7-1) | 18% |
| 1V2-HH-1 | (2-1) | 10% |
| 1V2-HH-2 | (2-1) | 7% |
| VFF-HHB-1 | (3-2-2) | 5% |
| V2-HHB-1 | (3-2-2-1) | 5% |
| 3-HH-V | (—) | 15% |
| 3-HH-O1 | (—) | 5% |
| 3-HH-VFF | (—) | 4% |

NI = 77.7° C.;
Tc ≦ −20° C.;
Δn = 0.096;
η = 17.6 mPa · s;
Δε = −2.7;
τ = 9.9 ms;
VHR-1 = 99.1%;
VHR-2 = 98.1%;
VHR-3 = 98.1%.

Example 7

| | | |
|---|---|---|
| 3-H2B(2F,3F)-O2 | (1-2-1) | 10% |
| 5-H2B(2F,3F)-O2 | (1-2-1) | 10% |
| V-HB(2F,3F)-O2 | (1-1-1) | 4% |
| 3-HHB(2F,3F)-O2 | (1-4-1) | 5% |
| 3-HBB(2F,3F)-O2 | (1-7-1) | 13% |
| 5-HBB(2F,3F)-O2 | (1-7-1) | 5% |
| 1V2-HH-1 | (2-1) | 19% |
| 1V2-HH-2 | (2-1) | 5% |
| 1V2-HH-3 | (2-1) | 10% |
| V2-BB-1 | (3-1-2-1) | 4% |
| V-HHB-1 | (3-2-2-1) | 10% |
| 3-HH1OB(2F,3F,6Me)-O2 | (—) | 5% |

NI = 74.0° C.;
Tc ≦ −20° C.;
Δn = 0.101;
Δε = −2.7;
τ = 10.4 ms;
VHR-1 = 99.2%;
VHR-2 = 98.0%;
VHR-3 = 98.2%.

The compositions in Examples 1 to 7 have a shorter response time than those in Comparative Example 1 to 3. Thus, the liquid crystal composition herein has much superior characteristics to that described in the patent document Nos. 1 to 3.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal composition having a negative dielectric anisotropy that comprises at least one compound selected from the group of compounds represented by formula (1) as a first component and at least one compound selected from the group of compounds represented by formula (2) as a second component:

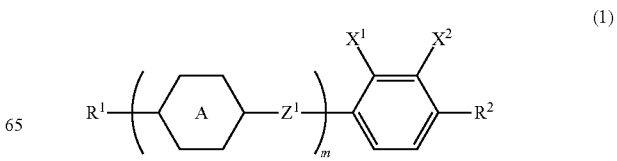

-continued

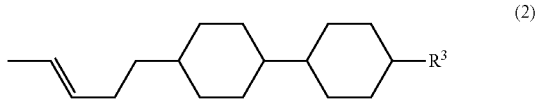
(2)

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $R^3$ is independently alkyl having 1 to 12 carbons, alkoxy having 1 to 12 carbons, or alkenyl having 2 to 12 carbons in which arbitrary hydrogen is replaced by fluorine; ring A is independently 1,4-cyclohexylene or 1,4-phenylene; $Z^1$ is independently a single bond, ethylene, methyleneoxy or carbonyloxy; $X^1$ and $X^2$ are each independently fluorine or chlorine; m is 1, 2 or 3.

2. The liquid crystal composition according to claim 1, wherein the first component is at least one compound selected from the group of compounds represented by formulas (1-1) and (1-7):

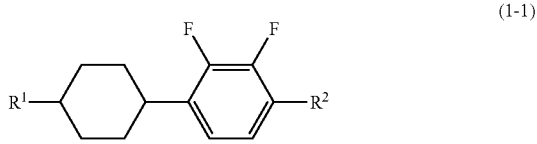
(1-1)

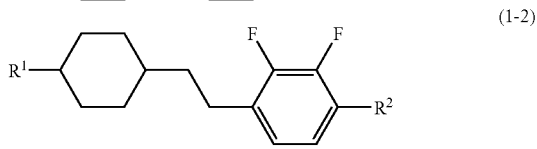
(1-2)

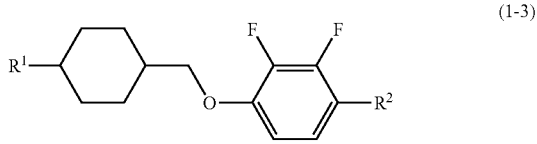
(1-3)

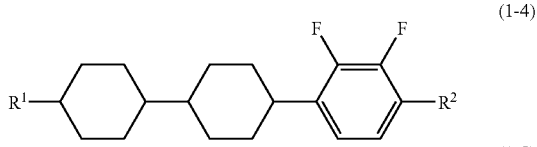
(1-4)

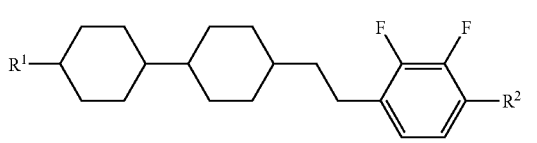
(1-5)

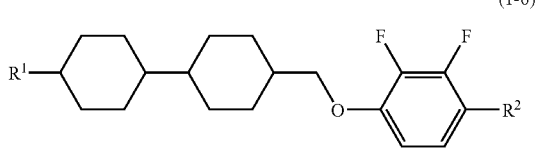
(1-6)

(1-7)

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

3. The liquid crystal composition according to claim 2, wherein the first component is at least one compound selected from the group of compounds represented by formulas (1-1).

4. The liquid crystal composition according to claim 2, wherein the first component is at least one compound selected from the group of compounds represented by formula (1-4).

5. The liquid crystal composition according to claim 2, wherein the first component is at least one compound selected from the group of compounds represented by formulas (1-7).

6. The liquid crystal composition according to claim 2, wherein the first component is a mixture of at least one compound selected from the group of compounds represented by formula (1-1) and at least one compound selected from the group of compounds represented by formula (1-4).

7. The liquid crystal composition according to claim 2, wherein the first component is a mixture of at least one compound selected from the group of compounds represented by formula (1-1) and at least one compound selected from the group of compounds represented by formula (1-7).

8. The liquid crystal composition according to claim 1, wherein the ratio of the first component is in the range of approximately 5% to approximately 60% by weight and the ratio of the second component is in the range of approximately 5% to approximately 40% by weight, based on the total weight of the liquid crystal composition.

9. The liquid crystal composition according to claim 1 that further comprises at least one compound selected from the group of compounds represented by formula (3-1) and formula (3-2) as a third component:

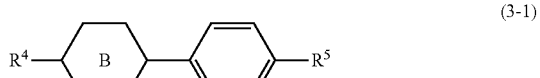
(3-1)

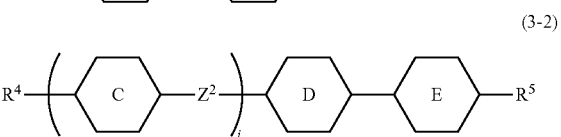
(3-2)

wherein $R^4$ and $R^5$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring B, ring C, ring D and ring E are each independently 1,4-cyclohexylene, 1,4-phenylene, 2-fluoro-1,4-phenylene, 3-fluoro-1,4-phenylene or 2,5-difluoro-1,4-phenylene; $Z^2$ is independently a single bond, ethylene, or carbonyloxy; and j is 1 or 2.

10. The liquid crystal composition according to claim 9, wherein the third component is at least one compound selected from the group of compounds represented by formulas (3-1-1) to (3-1-2) and formulas (3-2-1) to (3-2-9):

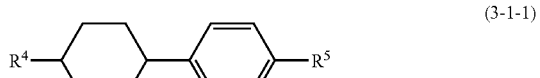
(3-1-1)

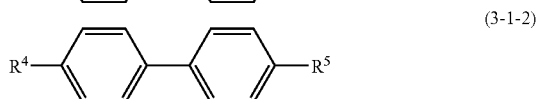
(3-1-2)

-continued (3-2-1) 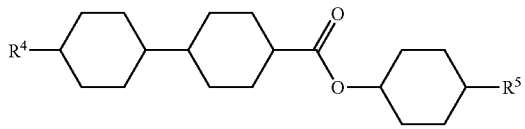

(3-2-2) 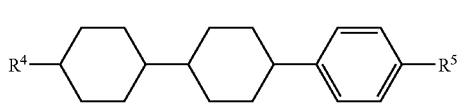

(3-2-3) 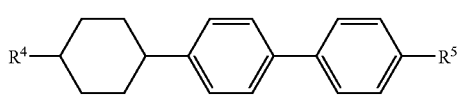

(3-2-4) 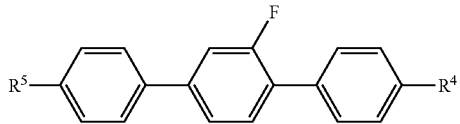

(3-2-5) 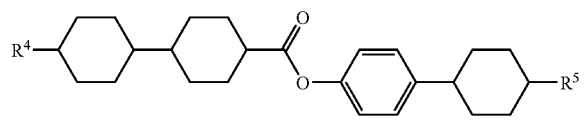

(3-2-6) 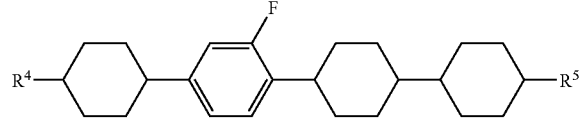

(3-2-7) 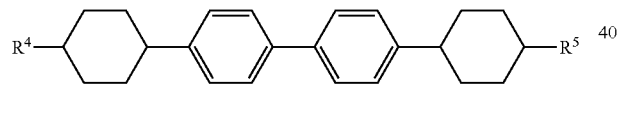

(3-2-8) 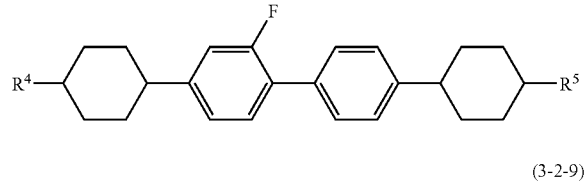

(3-2-9) 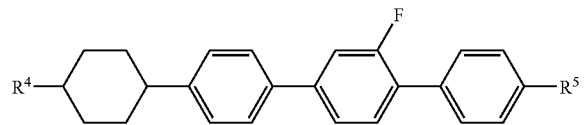

wherein $R^4$ and $R^5$ are each independently alkyl having 1 to 12 carbons, alkoxy having 1 to 12 carbons, or alkenyl having 2 to 12 carbons in which arbitrary hydrogen is replaced by fluorine.

11. The liquid crystal composition according to claim 9, wherein the ratio of the third component is in the range of approximately 5% to approximately 40% by weight based on the total weight of the liquid crystal composition.

12. The liquid crystal composition according to claim 1 that further comprises at least one compound selected from the group of compounds represented by formulas (4-1) and (4-2) as a fourth component:

(4-1) 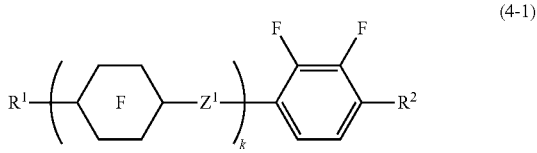

(4-2) 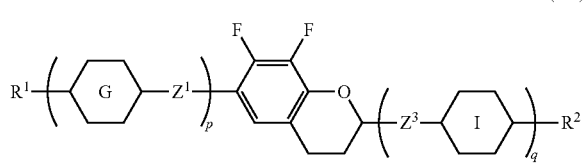

wherein $R^1$ and $R^2$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring F is independently tetrahydropyran-2,5-diyl, 1,4-cyclohexylene, or 1,4-phenylene; at least one ring-D F is tetrahydropyran-2,5-diyl, ring G and ring I are each independently 1,4-cyclohexylene or 1,4-phenylene; $Z^1$ and $Z^3$ are each independently a single bond, ethylene, methyleneoxy or carbonyloxy; k is 1, 2 or 3; p and q are 0, 1, 2 or 3; and the sum of p and q is 3 or less.

13. The liquid crystal composition according to claim 9 that further comprises at least one compound selected from the group of compounds represented by formulas (4-1) and (4-2) as a fourth component:

(4-1) 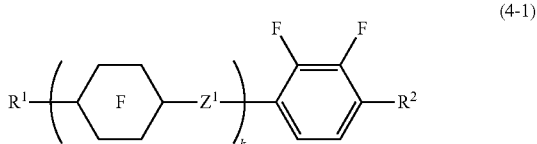

(4-2) 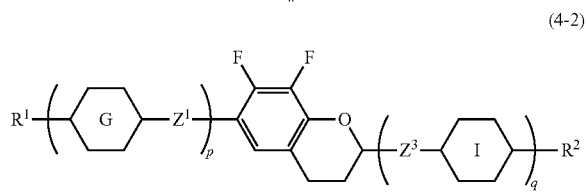

wherein $R^1$ and $R^2$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring F is independently tetrahydropyran-2,5-diyl, 1,4-cyclohexylene, or 1,4-phenylene; at least one ring-D F is tetrahydropyran-2,5-diyl, ring G and ring I are each independently 1,4-cyclohexylene or 1,4-phenylene; $Z^1$ and $Z^3$ are each independently a single bond, ethylene, methyleneoxy or carbonyloxy; k is 1, 2 or 3; p and q are 0, 1, 2 or 3; and the sum of p and q is 3 or less.

14. The liquid crystal composition according to claim 12, wherein the fourth component is at least one compound selected from the group of compounds represented by formulas (4-1-1) to (4-1-7) and formulas (4-2-1) to (4-2-4):

(4-1-1) 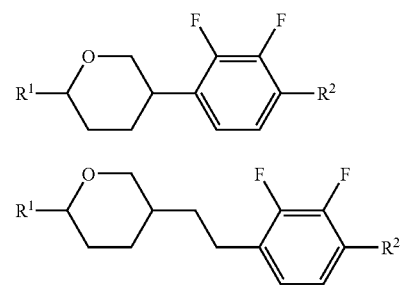

(4-1-2) 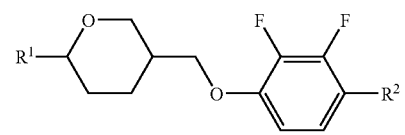

(4-1-3) 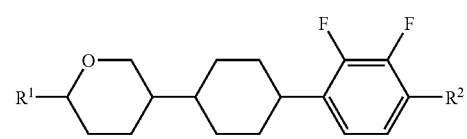

(4-1-4) 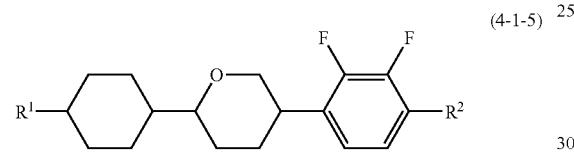

(4-1-5) 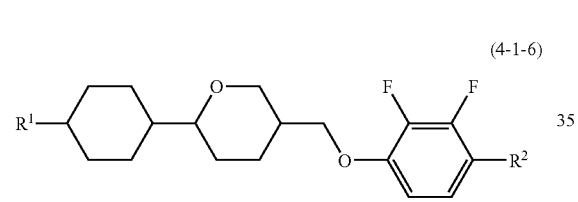

(4-1-6) 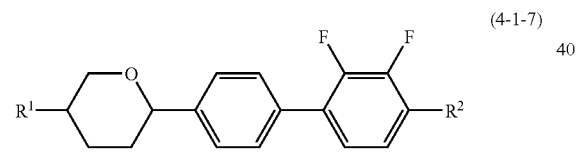

(4-1-7) 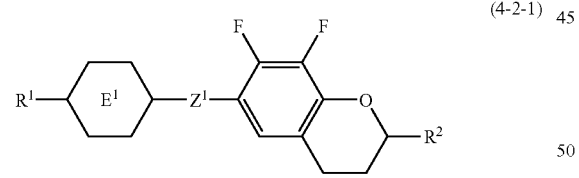

(4-2-1) 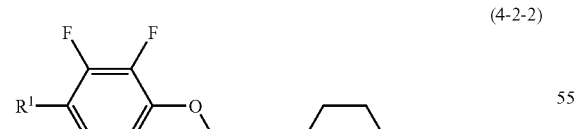

(4-2-2)

(4-2-3) 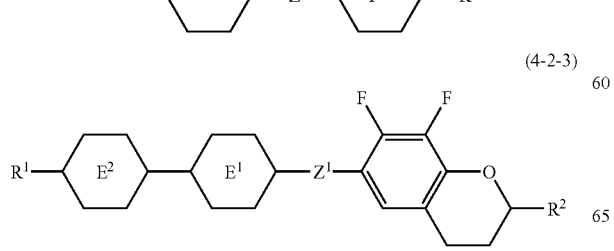

(4-2-4) 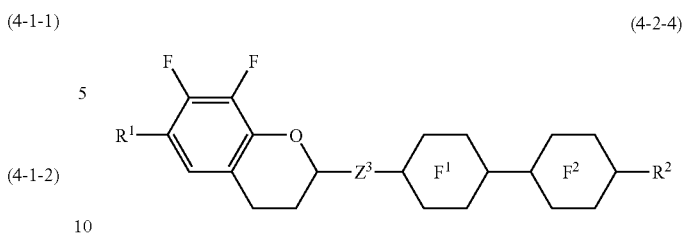

wherein $R^1$ and $R^2$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring E1, ring $E^2$, ring $F^1$, ring $F^2$ are each independently 1,4-cyclohexylene or 1,4-phenylene; $Z^1$ and $Z^3$ are each independently a single bond, ethylene, methyleneoxy or carbonyloxy.

15. The liquid crystal composition according to claim 13, wherein the fourth component is at least one compound selected from the group of compounds represented by formulas (4-1-1) to (4-1-7) and formulas (4-2-1) to (4-2-4):

(4-1-1) 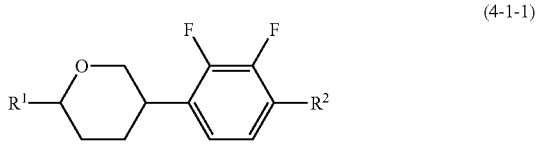

(4-1-2) 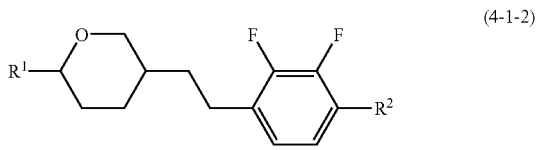

(4-1-3) 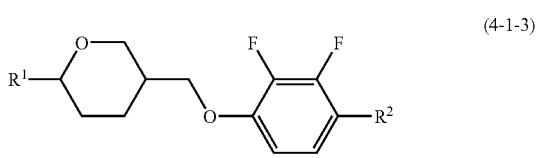

(4-1-4) 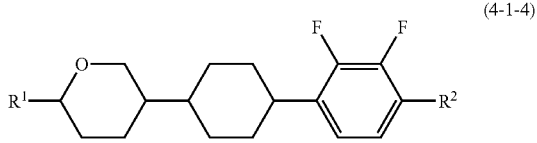

(4-1-5) 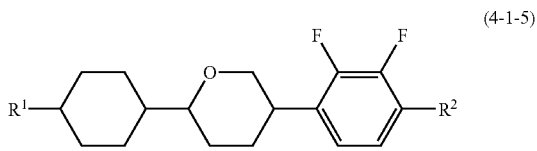

(4-1-6) 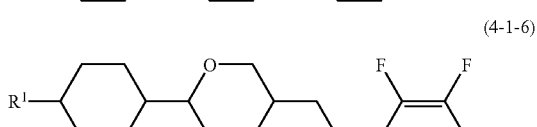

(4-1-7) 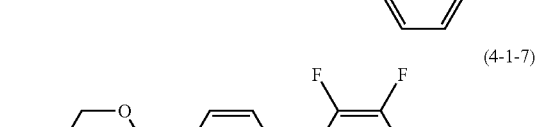

-continued

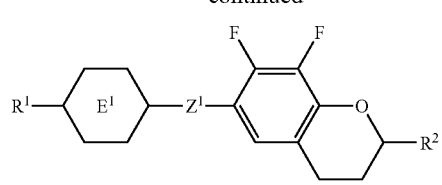
(4-2-1)

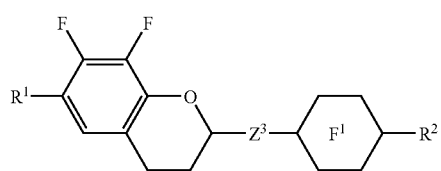
(4-2-2)

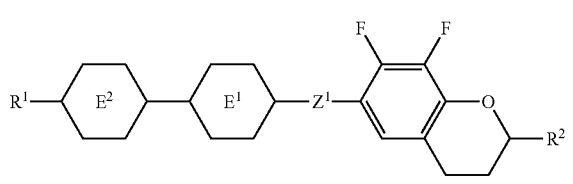
(4-2-3)

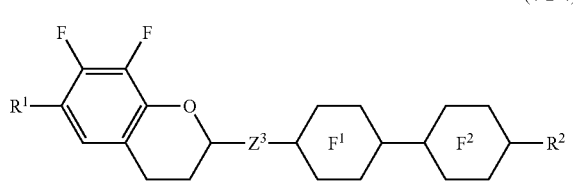
(4-2-4)

wherein $R^1$ and $R^2$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring E1, ring $E^2$, ring $F^1$, ring $F^2$ are each independently 1,4-cyclohexylene or 1,4-phenylene; $Z^1$ and $Z^3$ are each independently a single bond, ethylene, methyleneoxy or carbonyloxy.

16. The liquid crystal composition according to claim 12, wherein the ratio of the fourth component is in the range of approximately 5% to approximately 50% by weight based on the total weight of the liquid crystal composition.

17. The liquid crystal composition according to claim 13, wherein the ratio of the fourth component is in the range of approximately 5% to approximately 50% by weight based on the total weight of the liquid crystal composition.

18. The liquid crystal composition according to claim 1, wherein the maximum temperature of a nematic phase is approximately 70° C. or higher, the optical anisotropy (25° C.) at a wavelength of 589 nm is approximately 0.08 or more, and the dielectric anisotropy (25° C.) at a frequency of 1 kHz is approximately −2 or less.

19. A liquid crystal display device that comprises the liquid crystal composition according to any one of claim 1.

20. The liquid crystal display device according to claim 19 wherein an operating mode of the liquid crystal display device is a VA mode, an IPS mode or a PSA mode, and a driving mode of the liquid crystal display device is an active matrix mode.

* * * * *